No. 717,196. Patented Dec. 30, 1902.
C. LA F. HILLMAN.
MEANS FOR CONVEYING OIL FOR CALMING WAVES.
(Application filed Apr. 12, 1901.)
(No Model.) 4 Sheets—Sheet 4.
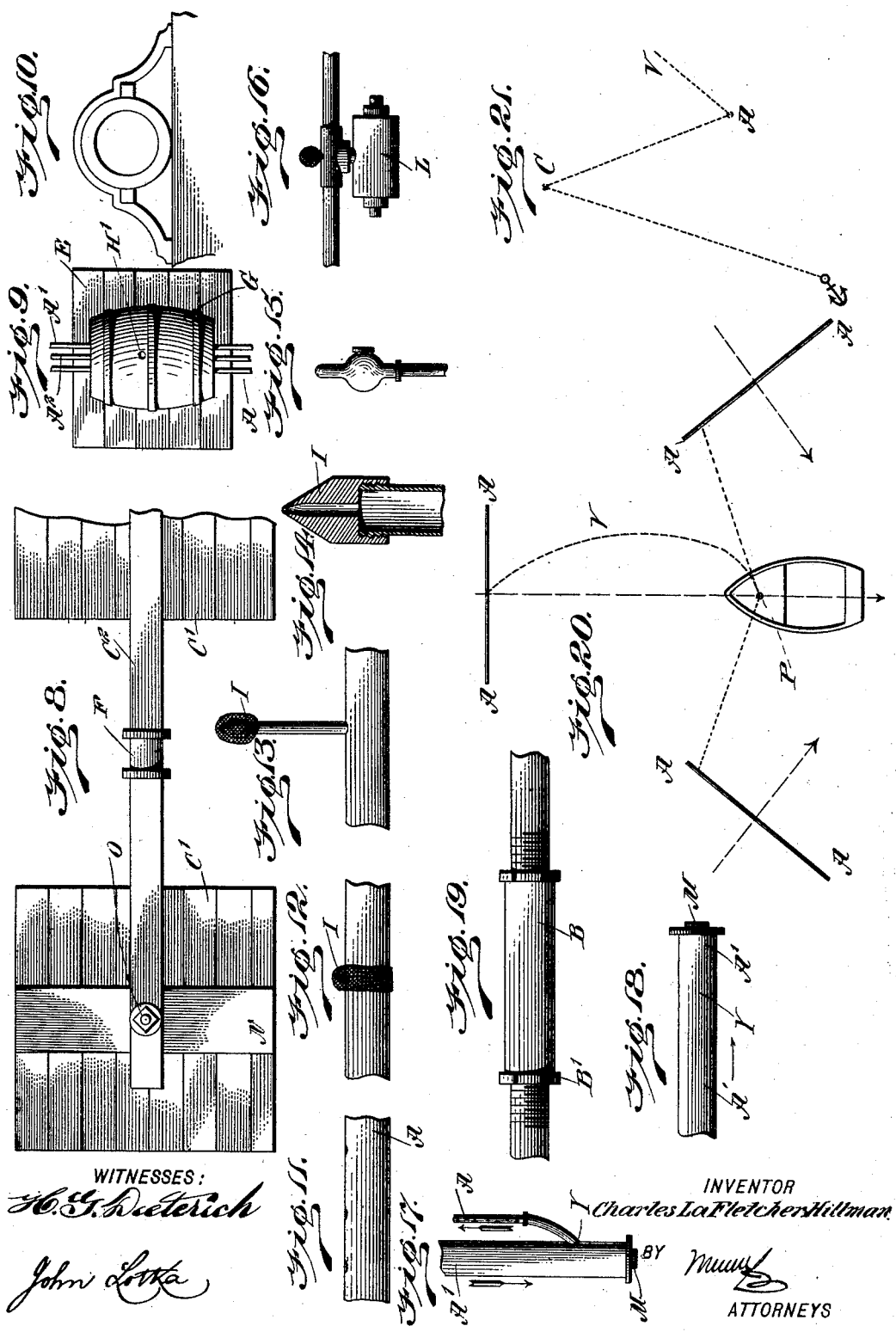
WITNESSES:
INVENTOR
Charles La Fletcher Hillman
BY
ATTORNEYS

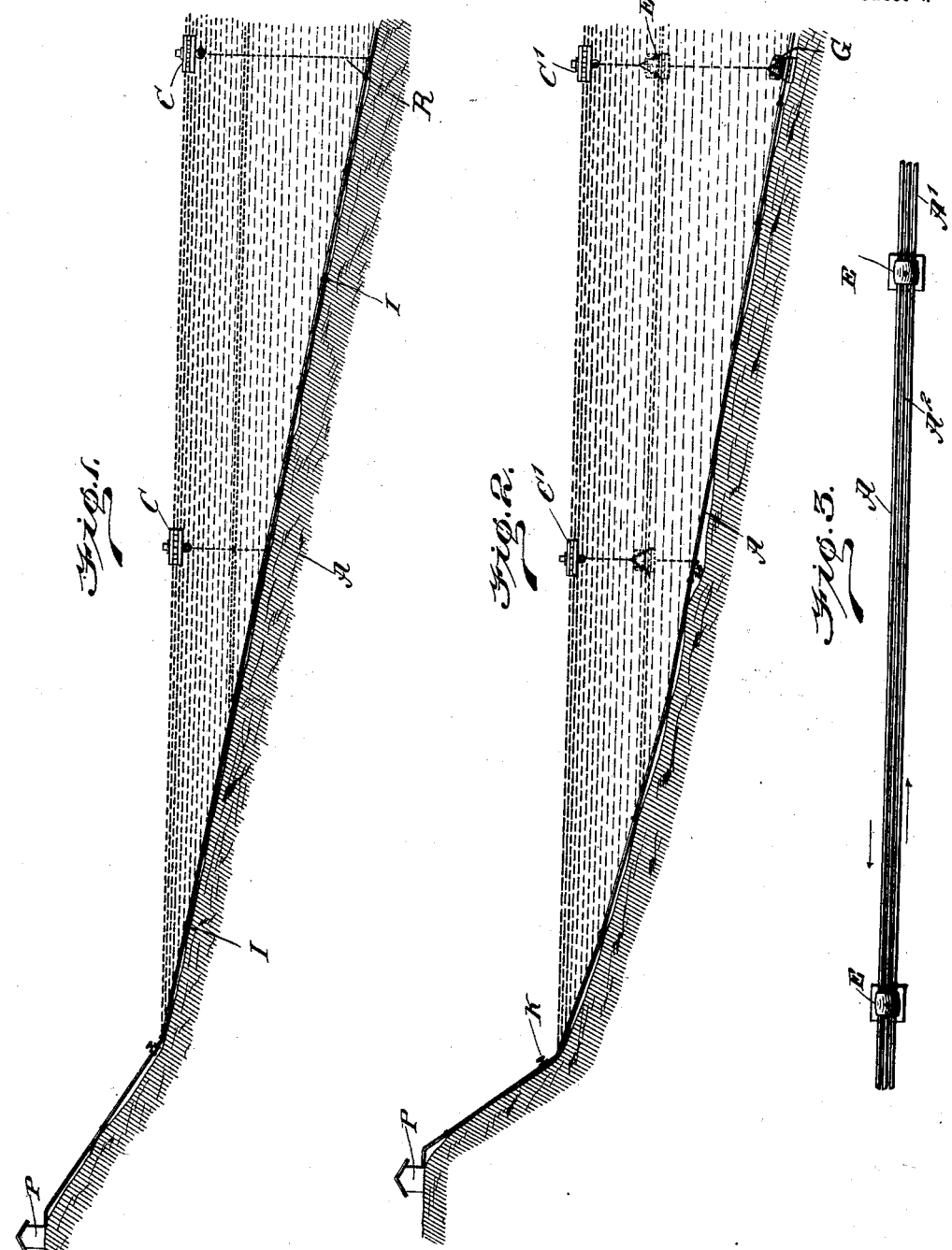

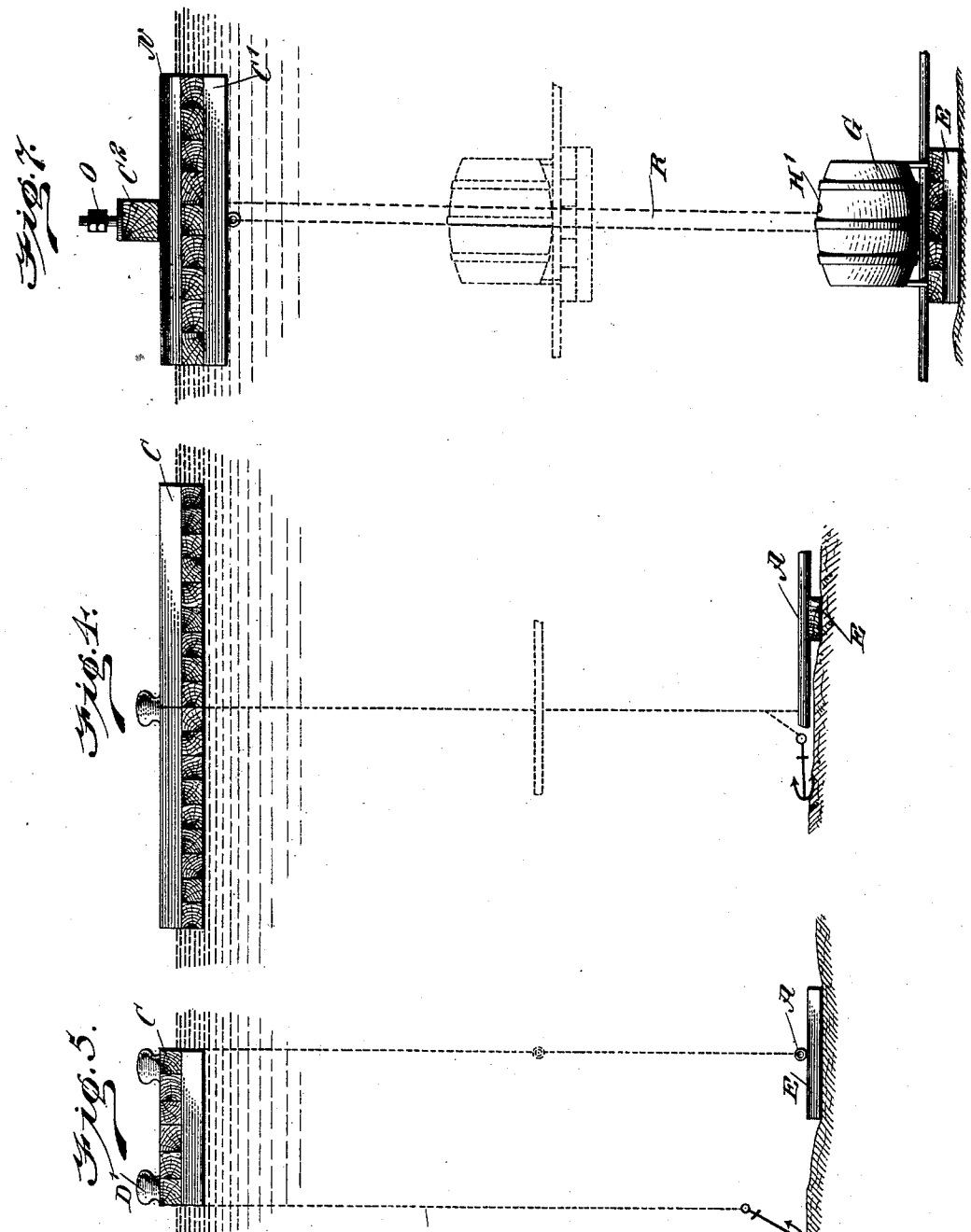

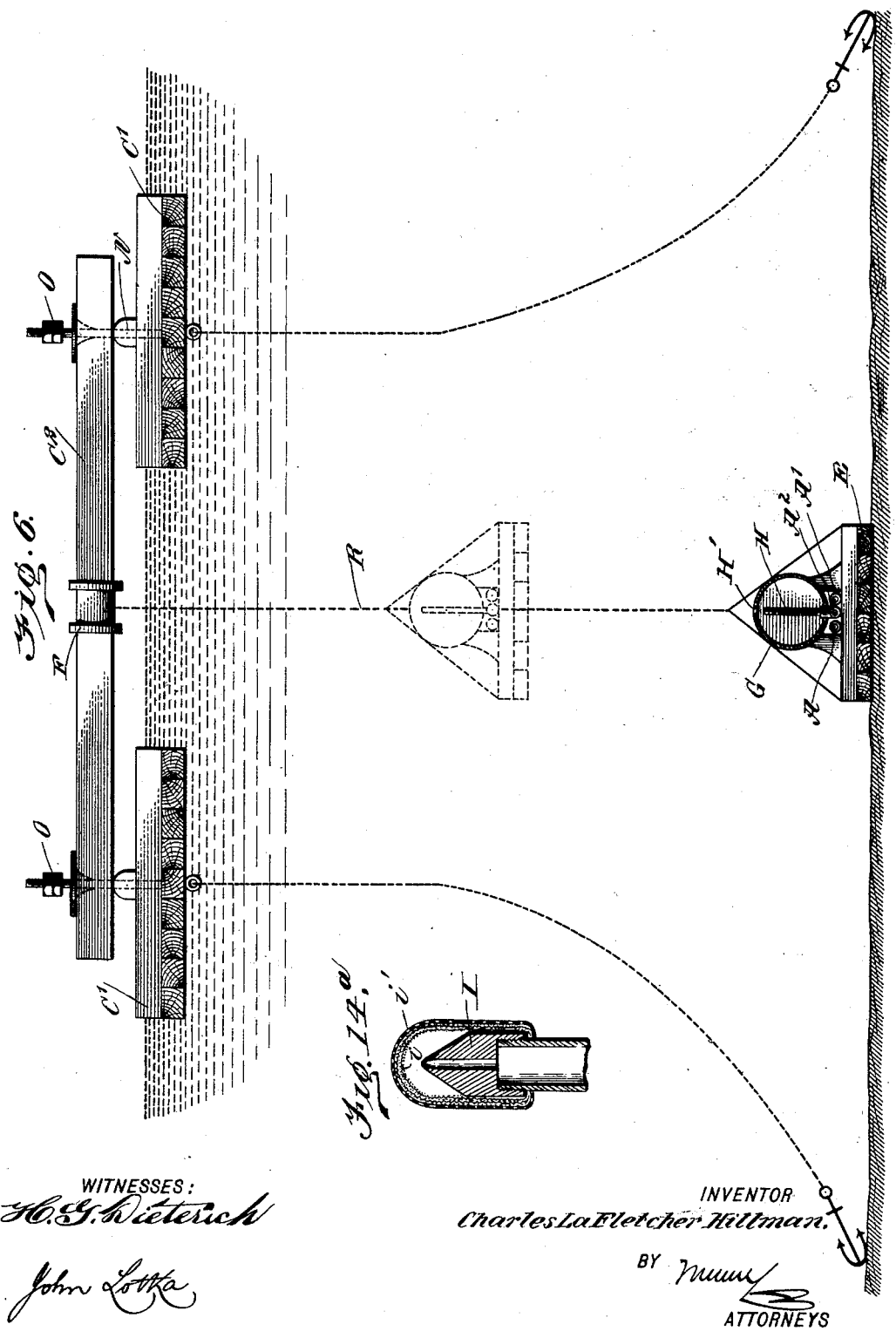

UNITED STATES PATENT OFFICE.

CHARLES LA FLETCHER HILLMAN, OF SANTIAGO, CHILE.

MEANS FOR CONVEYING OIL FOR CALMING WAVES.

SPECIFICATION forming part of Letters Patent No. 717,196, dated December 30, 1902.

Application filed April 12, 1901. Serial No. 55,588. (No model.)

*To all whom it may concern:*

Be it known that I, CHARLES LA FLETCHER HILLMAN, a citizen of the United States, residing at Santiago, in the Republic of Chile, have invented new and useful Improvements in Means for the Conveyance of Oils or other Materials for Calming the Surfaces of Bays or other Bodies of Water, of which the following is a full, clear, and exact description.

My invention relates to means used for quieting the surfaces of bodies of water, whereby protection is afforded to ships or boats of any size, be they at sea or anchored, and to means affording protection to and securing the safe approach to jetties, quays, landings, and shores, to vessels at sea, and to means of calming the surfaces in bays, rivers, and other bodies of water at or near lighthouses, life-saving stations, wrecks, sea-walls, or other exposed objects or localities. The calming of the surface will so lessen the violence and action of the waves that the dragging of anchors, parting of anchor-chains, &c., will often be avoided, as will also the loss of vessels and their contents.

It relates to and is based on the now well-known action of the film of oily liquids or emulsions, which, however infinitesimal in thickness, not only impedes the formation of and ascent or detachment from the surface of spray to be driven by the wind, with the comparatively insignificant evils of annoyance to passengers, crews, and laborers, wetting and damage to goods, paralyzation of lighterage, loading, unloading, &c., augmentation of delays, insurance, and other expenses, but also impedes the detachment from the surface of larger bodies and masses of water, which, hurled through the air by wind, storm, or hurricane, carry destruction to the stoutest vessels and strew the shores with wreckage of the most massive constructions. The use of this method will largely diminish, if not altogether suppress, the dangers from rollers of the beach and at other points having no landing facilities. It will permit the transhipment at sea of passengers, freight, and troops, and a ship provided with a simple plant may by its use safely outride an otherwise fatal storm.

The object of the invention is to provide an improved means of conducting without loss to the exact locality at any moment and to distribute equally or unequally, as may be desired, with absolute safety to the operators and under any condition of stormy or adverse weather calming agents of the class indicated.

The invention will be fully described hereinafter and the features of novelty pointed out in the appended claims.

Reference is to be had to the accompanying drawings, forming part of this specification, in which similar characters of reference indicate corresponding parts in all the figures.

Figure 1 is an elevation of a plant according to my improvements. As there is but a single line of piping, no plan is given or needed, the piping following the sinuosities of the bottom. For clearness the anchorages are not shown in this figure nor in Figs. 2 and 3. Also cases will occur where no anchorages will be required. Figs. 2 and 3 are respectively an elevation and a plan of the plant, with the flow of the quieting agent taking generally two opposite directions. Figs. 4 and 5 are respectively side and end views of Fig. 1 enlarged. A simple form of float is also shown. Figs. 6 and 7 are respectively side and end views corresponding to Figs. 2 and 3 enlarged. They also show a float made in two sections. Fig. 8 is a plan of the float last mentioned. Fig. 9 is a plan of a rest or pipe-carrier that may be used when more than a single line of piping is employed. It is also shown in Figs. 6 and 7. Fig. 10 is merely given to indicate a method whereby, should flexible tubing be preferred, ribs of the same material may be welded thereon, acting as shoulders to clamps to prevent the tube from twisting or turning, thus altering the direction of the discharge. The figure needs no further mention. Fig. 11 shows a short piece of distributing tube or pipe with simply a perforation or aperture in the walls of the same for egress of the liquid. Fig. 12 shows a nozzle with male thread screwed into the walls of the pipe. Fig. 13 shows a nozzle with a piece of pipe between it and the distributing-pipe. Fig. 14 gives cross-section for points of nozzles. Fig. 14ᵃ is a detail sectional view illustrating the covering for the oil-exit port, and Fig. 15 shows a simple form of valve to which a nozzle may be attached should such valve be desired.

Fig. 16 shows a form of sediment-chamber. Figs. 17 and 18 show a form of uniting the distributing-pipe with the pipe supplying the same when this latter or supply pipe is of capacity sufficient to act as a supply deposit for the liquid. Fig. 19 shows a form of coupling for tubing. Figs. 20 and 21 are diagrams illustrating how the boats and docks may be protected by my invention.

The object and character of the plant indicate a propriety in first treating of its location.

Generally it may be said that the placing of the plant, with its anchorages, buoys, or floats, tubing, &c., should, if in or for a harbor or roadstead, so be effected as to avoid as far as possible fouling or disturbance by vessels at anchor, departing, or entering. It should be located with reference to the quarter from which high winds and storms are most prevalent. In cases where the currents at the surface or below the surface are frequent the plant should be so situated as to permit the quieting agent ample time to ascend to the surface by reason of its lighter specific gravity and spread, producing the desired film before it reaches the area or vessel or object or locality it is destined to favor and to which it will be carried by surface winds or surface currents. It will be noted that no specified distance is given as what should exist between the outlets. If the plant is to be but slightly submerged, the apertures, orifices, or nozzles would be preferably smaller and closer together than if at any considerable depth below the surface, the quieting agent in the latter case having more time for spreading before attaining said surface. Figs. 1 and 2 show the piping both at the bottom and (in dotted lines) suspended between the surface and the bottom. Suspension may often be desirable as a temporary measure or as a permanent one and may often be employed with no objection thereto. In many harbors and their entrances the great advantages of the protection would make any inconvenience of relative insignificant importance.

Of course in the fittings no materials should be used of a kind producing galvanic action.

The plant comprises one or more lines of piping suitably connected with a deposit containing the quieting agent, the said deposit of a fixed character, as at P P, Figs. 1 and 2, or of the simple form of an oil-cask on shore, in the hold of a vessel, or suspended in the rigging. Should the distributer or discharge or perforated pipe A, Figs. 1, 3, 4, and 5, receive the material directly from the deposit, there need be but a single line of piping, said piping conveying the material and also releasing it to the surrounding water through simple apertures, as shown in Fig. 11, or through nozzles, as shown by I I I I, Figs. 12, 13, and 14, or through valves of any proper make, Fig. 15.

Generally it will be preferable where the material is fed from a shore that the pipe A receive said material at its lowest point. In such case a special pipe for supplying A would most frequently run parallel to the same and deliver its contents to A near its end farthest from the deposit. Thus, as has been said, the flow would be in two and opposite directions from the deposit in what may be called the "supply-pipe" A', Figs. 3, 6, 9, 17, and 18, and toward the deposit by the distributing or perforated pipe A. The arrow-heads in Figs. 3, 17, and 18 indicate what would generally be the relative direction of flow.

Reception of the material at the lowest point by the distributing-pipe facilitates procuring a more equal discharge at the different outlets, whatever may be their depth below the surface or their distance from the shore. The slight difference in specific gravity of the agent and of water, fresh or salt, will, with the main deposit sufficiently elevated above water-level, admit that advantage be taken of the weight of the column of the agent to establish automatic action, though, as will be seen, a pump is essential to a complete and reliable outfit. When fed at the outer extremity, there are various reasons why it would be preferable that the distributing-pipe be continued to the shore. After intervals of rest with the force-pump the nozzles or apertures may, if clogged, be opened with a stream of water or air driven at high pressure, the pipe also thus being flushed and in many cases freed from ooze or other extraneous matter, even sand. In Figs. 6 and 9 the supply-pipe A' is shown as having the same diameter as the distributer-pipe A, as would generally be the case; but should A' be sufficiently large to act at the same time as a deposit, as shown in Figs. 17 and 18, A' A', the sediment near the closed end may be flushed or blown out by placing a high-pressure spring-valve M M at said end. In the same manner may be cleansed the sediment-chambers, (shown in L, Fig. 16.) Any portion of the quieting agent not expelled and that is returned through the distributer A', Figs. 3, 6, 9, and 17, may, if necessary, be passed through a strainer before again going into the deposit.

Should absence of mud or ooze so permit, the piping may rest on the bottom, or it may be clamped to or on or beneath balks of timber or to planking or to other rests and in such manner as shall hold the nozzles or discharges in any preferred direction. If timber is employed, it will aid placing if a class is selected the specific gravity of which is greater than that of water. Other cases will present themselves where ooze or mud at bottom will exact an unusual spread of bearing to avoid sinking into the soft material. Each case will offer special problems for the judgment of the person in charge.

In Figs. 4 and 5 separate chocks or cleats on the floats C, with good space between, tend to prevent fouling or entangling of the two cables or chains, one relating to the anchorage and the other to the pipe. The anchoring-cable may be shortened or lengthened, as circumstances exact, and the other may be raised or lowered for examination of tubing or suspension between the bottom and surface. Only where flood and ebb tides vary much in level or are accompanied by much current would extra precautions be needed that would have their exigencies duly made apparent.

Where the material is fed to the distributing-pipe at the lower end, thereby needing more than one line of pipe, more effective provision must generally be made to prevent fouling of anchor and suspender cables.

In Figs. 6 and 7, $C'$ $C'$ $C'$ show a two-sectioned float, the sections at the same time being joined and stayed apart by a top bar $C^2$, Figs. 6 and 7, the bar at its center carrying a metal spool or flanged forging F, where is wound or hung the suspender R, to which is attached a rest or carrier E, the spool keeping the suspender from shifting and the cross-bar from chafing. The connection of the cross-bar over the timber N and the fastenings of the pins O $o$ should be effected so as to insure that the bar acts to maintain the distance between the two sections of float and at the same time allow the semi-independent riding movement each section exacts by the constantly-changing surface of the water.

In Figs. 3, 6, and 9 will be seen the pipes A $A'$ $A^2$ on the rest or carrier E. $A^2$ is an air-pipe not connected with the other pipes. Midway on the rests E and by a short vertical tube H air is discharged inside of chambers G, fastened to the rests or piping. The purpose of the air-chambers in plants where it is deemed well to apply them is merely to aid in raising carriers and piping when desired to do so. That these chambers may not impede the sinking of the apparatus, a small hole must exist at the top of each, as H', (see Figs. 6 and 9,) for exit of the air. The entrance-hole for the vertical pipe H must be sufficiently larger than said pipe to allow free egress of the water in the chamber at times when it is proposed to raise the apparatus. The larger size of hole in no wise decreases the efficiency of the chamber, at the same time allowing speedy detachment or attachment at the surface. In forcing the air into the chamber the pump would have to overcome the slight leakage through H'. Ofttimes no better chamber can be employed than a cask with the heads braced interiorly.

In Figs. 3, 6, and 9 the supply-pipe A' has not the increased capacity that would be given were it to act at the same time as a deposit, as in Figs. 17 and 18. It will be observed that feeding the distributer at its outer extremity admits that a valve near water-level K, Fig. 2, shall so act that by closing it at any moment when it is desired to shut off the egress of the liquid the amount contained in the supply-pipe will by the effect of the water entering the nozzles and acting inside the piping at the point of union with the discharge-pipe Y, Fig. 17, absolutely impede loss. It will also be observed that said valve K may often be used for graduating an automatic discharge or release of the material.

All outlets, be they simple perforations, as in Fig. 11, or by nozzles I I I I of the other figures, should be protected that they may not serve as inlets for sand, ooze, particles of shell, aquatic vegetation, &c. This may easily be effected by a loose wrapping of coarse-meshed wire-cloth so put on that no strand of the same shall press upon and close the diminutive exit for liquid, this wrapping or basket being enveloped by another wrapping of woolen or hair cloth or similar material sufficiently fine in mesh to impede the entrance of the said sand, &c., but that will at the very most offer a momentary impediment to the liberation of the liquid to the surrounding water, said construction being shown by Fig. 14$^a$, in which $i$ indicates the wire-cloth and $i'$ the wrapping which envelops the wire-cloth. Thus at each point of exit would exist a compartment or cell from which the liquid must perforce exude in consequence of a gravity lesser than that of the water or because the weight or pressure of liquid in rear of it is greater than that of the column of outside water or because of the next plunge of the force-pump. Where there is much ooze at bottom an extended outlet, like as in Fig. 13, may be of advantage.

Fig. 14 shows a preferred form in cross-section of nozzle. It is shaped with the smallest possible surface on top that sand, &c., may not find lodgment and with the bore enlarged close to the orifice that such particles as do lodge and enter may not stop and clog, but have probabilities of entering the pipe, such being the lesser of the evils. The small extension-pipe may be screwed directly into the walls of the distributer or into T's employed to act as couplings.

In Fig. 16 the deposit L for sediment is attached to the distributer-pipe by an ordinary T. If spring-valves are employed at the ends, the sediment would be flushed out after the method already described in treating of Figs. 17 and 18. Should plugs be used, they would have to be removed on raising the apparatus to the surface or by a diver.

As has already been stated in connection with Figs. 17 and 18, the supply-pipe shown in the other figures as being of the same diameter as the distributer is here shown, as in A' A', of capacity to act at the same time as a deposit for the agent. The reason for the form given at the union with the discharge-pipe is evident in the tendency that sediment from the distributer A would have to drop to the extreme end to there await the flushing or cleaning spoken of. Similar reasons would hold for making a like union were distributer A and the supply-pipe A' of equal size, though a more simple form would be a T, with an extension-tube placed at extremity of the latter, an ordinary bend being screwed into the T to unite A' and give the return direction to A.

Fig. 19; all tubing may be that usually made for gas, water, or steam, the better class, with thick walls, will of course have a longer life than the common article; by the use of shallow but fine threads and extra long couplings B, made from a size of piping next larger than that it is intended to join, the same strength of thread can be secured without cutting away so much thickness of the pipe-walls, thus insuring greater duration against the corrosive action of the water; the "lock-nuts" would be the usual hexagonal ones, with change of threads to correspond. Long couplings would facilitate placing of the pipe in sections of more than a single length and admit the easy removal of any length or section. Flexible tubing will often be preferred, thus avoiding corrosion and facilitating the placing, as it could be paid out like a cable. In fact, the small diameter of the metal pipe which would be usually employed will permit the paying out somewhat after the same fashion. Even where metal piping is used it may be of advantage where the bottom is much broken to make part of the joints with short pieces of flexible tubing. They may also be made with six L's or bends connecting to the main lines of tubing and by means of two nipples or space-nipples two pieces of pipe one or two feet long.

It is well to recollect that only in the supply-pipes that are made to act as deposits will any slight leak be of importance.

Figs. 20 and 21 show how parts of bays, wrecks, &c., may be protected. Simple anchorages would localize floats C. From them would be suspended cables R, which would hold the distributing-pipe A at bottom or at any height below the surface sufficient to allow the passage of vessels without probabilities of fouling. If the distributer A is so long as to make such prudent, several anchorages and floats may be used, always placing them to leeward, the sway of anchor-cable D and suspender R always tending to the position shown in Fig. 21. If the deposit P is on a hulk, the latter should be anchored within the protected area, and the connections may be with flexible tubing V V V V. Connections need not be permanently attached. Any or all of those ends nearest the hulk may be detached when connection is not required and (secured by a line, whereby it may be hauled in at any moment) be allowed to sink or swim with a semiloose float.

It will easily be seen how vessels at sea carrying a section or two of properly-arranged tubing could with boats or employing "sea-anchors" in a very short time establish protection on the side or sides in danger. Spars projected from the bow and with a horizontal yard carrying the distributer would often avert disaster by discharge of the liquid.

The arrangement of the various parts, as well as their construction, may be modified according to circumstances without departing from the nature of my invention.

Having thus described my invention, I claim as new and desire to secure by Letters Patent—

1. An apparatus of the class described, provided with a tube having discharge-apertures, with a deposit for the material employed, and having adjustable rests connected therewith.

2. An apparatus of the class described, provided with a tube having discharge-apertures, with a deposit for the material employed, rests connected therewith, and provided with floats for carrying the said rests.

3. An apparatus of the class described, provided with a tube having discharge-apertures, and said tube provided with another non-perforated tube arranged parallel therewith and adapted to supply the material employed.

4. An apparatus of the class described, provided with a tube having discharge-apertures, said tube provided with another non-perforated tube arranged parallel thereto and adapted to supply the material employed, that with apertures being extended to or near a deposit or point whence the tube without apertures receives its material.

5. An apparatus of the class described, provided with a tube having discharge-apertures, said tube having another non-perforated parallel tube to supply the material employed at the distant end of said perforated tube, and this former tube having a cock, valve, or other attachment, to stop or to regulate the flow of the material.

6. An apparatus of the class described, provided with a tube having discharge-apertures, said tube having another non-perforated and parallel tube to conduct the material employed, the foregoing provided with rests, or carriers.

7. An apparatus of the class described, provided with a tube having discharge-apertures, said tube being provided with another to conduct the material employed, the foregoing provided with rests or carriers, and the foregoing provided with anchorages and floats, the floats being in sections and attachable to each other, anchorages and floats properly provided with the appendages for localizing the apparatus and for raising, lowering and suspension.

8. An apparatus of the class described provided with a tube having discharge-apertures, said tube being provided with another tube to conduct the material, the foregoing provided with an air-chamber, or chambers, the chambers having perforations at their tops for exit of air, apertures on under side of each, for entrance of an air-tube and for entrance and expulsion of water, and a tube for forcing air to the chambers.

9. An apparatus of the class described, provided with a tube having apertures or nozzles and open meshwork for covering said apertures and provided with sediment-chambers.

10. An apparatus of the class described, provided with a tube having apertures, open-mesh guards for each aperture, and pervious close-mesh covers for each aperture and provided with sediment-chambers.

11. In an apparatus of the class described, the combination with a submerged distributing device, of a float, and means for adjustably suspending the submerged distributing device at variable points below the float and the level of the water in which it is immersed.

12. In an apparatus of the class described, the combination with a float, of a carrier suspended from the float, a distributing device sustained by the carrier, and means for increasing or decreasing the buoyancy of the carrier.

13. In an apparatus of the class described, the combination of a chambered carrier, a distributing device connected therewith, and means for supplying gaseous fluid to said chambered carrier to increase the buoyancy thereof.

14. In an apparatus of the class described, the combination with a pipe having means for distributing a quieting agent, of another pipe connected with a source of supply of the quieting agent and also connected with the distributing-pipe, so that the flow through the two pipes will be in opposite directions.

15. In an apparatus of the class described, the combination with a submerged distributing-pipe having means for the egress of a quieting agent, of sediment-collectors in said pipe, and means for flushing the pipe and the sediment-collectors.

16. In an apparatus of the class described, the combination with a float, of a submerged carrier, and distributing and feed pipes supported thereby in submerged conditions.

17. In an apparatus of the class described, a two-part float having its members coupled together, combined with a submerged carrier suspended from said float, and a distributing-pipe sustained by the carrier.

18. In an apparatus of the class described, the combination of a float, a submerged carrier suspended adjustably from the float and provided with a chamber, and lines of piping sustained by the float, one of the pipes arranged to discharge to the chamber.

In testimony whereof I have signed my name to this specification in the presence of two subscribing witnesses.

CHARLES LA FLETCHER HILLMAN.

Witnesses:
CHARLES T. WESSEL,
VALENTIN DILANOR ROSS.